United States Patent [19]

Messina

[11] 4,311,464
[45] Jan. 19, 1982

[54] GRID SYSTEM FOR LAYING OUT AND/OR PRECUTTING TILES OR THE LIKE

[75] Inventor: Joseph Messina, Philadelphia, Pa.

[73] Assignee: Michael Cancelliere, Philadelphia, Pa.; a part interest

[21] Appl. No.: 167,906

[22] Filed: Jul. 14, 1980

[51] Int. Cl.³ .................................. G09B 19/00
[52] U.S. Cl. .............................. 434/74; 434/79
[58] Field of Search ............ 33/1 B, 1 F, 1 G, 174 B; 434/72, 74, 75, 79, 80, 81, 85, 87, 90, 153, 368, 408, 427, 416, 430

[56] References Cited

U.S. PATENT DOCUMENTS

| 892,552 | 7/1908 | Rexer | 33/1 F |
|---|---|---|---|
| 1,716,036 | 6/1929 | Dunning | 33/1 B X |
| 1,992,083 | 2/1935 | McDonald | 434/90 |
| 2,090,186 | 8/1937 | Corbett | 434/87 X |
| 2,095,943 | 10/1937 | Zachs | 33/1 B |
| 2,127,047 | 8/1938 | Pinney | 434/80 |
| 2,526,569 | 10/1950 | Lewis et al. | |
| 2,610,413 | 9/1952 | Dasey | 434/72 X |
| 3,012,336 | 12/1961 | Brown | 434/80 |
| 3,878,586 | 3/1959 | Ohlsson | 434/80 |

FOREIGN PATENT DOCUMENTS

| 585235 | 10/1959 | Canada | 33/1 G |
|---|---|---|---|
| 493836 | 5/1919 | France | 434/153 |
| 288853 | 9/1931 | Italy | 434/75 |
| 959405 | 5/1964 | United Kingdom | 434/81 |

Primary Examiner—Harland S. Skogquist
Attorney, Agent, or Firm—Michael F. Petock

[57] ABSTRACT

An apparatus is provided for use in optimally arranging covering units, such as tiles or the like, or for enabling the precutting of such covering units before such units are applied to the floor or wall or ceiling to be covered. A first prescaled grid is provided on a substantially opaque sheet of paper on which the dimensions of the surface to be covered may be laid out. The exact dimensions of the floor, wall or ceiling to be covered may be laid out to scale on the first substantially opaque sheet. A second grid or line arrangement corresponding to the dimensions of the covering unit is provided on a substantially transparent sheet. This second grid is scaled to correspond to the scaling of the first grid on the substantially opaque sheet. By laying the second grid on the transparent sheet over the first grid, and varying its position, the optimal arrangement of the covering unit may be selected to provide the optimal arrangement of the covering units both for aesthetic purposes and to enable minimum cutting of the covering units. Further, the exact dimensions of each covering unit to be cut may be determined and the covering units may be precut accordingly. The transparent sheet may be further provided with openings at the intersection of the grid lines to enable the marking of the location of such intersections on the substantially opaque sheet.

3 Claims, 7 Drawing Figures

GRID SYSTEM FOR LAYING OUT AND/OR PRECUTTING TILES OR THE LIKE

BACKGROUND OF THE INVENTION

The present invention relates to a grid system for laying out and/or precutting tiles or the like. More particularly, the present invention relates to such a system in which it is possible to select in advance the best possible arrangement of ceiling, floor or wall tiles and to enable exact determination of the proper amounts of such tile as will be needed and the proper cutting of such tiles without having to measure each individual tile unit to the surface to be covered.

This invention relates to a grid system which will enable an installer of covering units, such as floor, wall or ceiling tiles, to determine with accuracy the best arrangement of such tiles for pleasing appearance, and to further enable the exact determination in advance of the number of tiles or covering units which will be needed and the amount and nature of the cutting of such tiles. In the past, there was no known system for obtaining such information. In general, a person about to install such tiles, such as ceiling tiles, had to estimate what might be the best layout of such tiles. Usually this involved some mental gymnastics, an educated guess and possibly some calculations with respect to the surface to be covered and the size of the tiles to be put therein. However, even with all of this having been done, no picture could be created as to what the ultimate arrangement of the tiles would look like. This is true whether the tiles to be laid were floor tiles, wall tiles or ceiling tiles. However, as is known with respect to the mounting of ceiling tiles, it is usually necessary to construct an arrangement for holding the tiles to the ceiling. One such common structural arrangement in wide use today is that of a metal hanger arrangement comprised of main "T" hanger elements and crosspieces. The exact location of the main hangers and cross-hangers or supports had to be determined in advance of installing any of the ceiling tiles. This of course presents a troublesome situation in that a very substantial amount, if not all, of the work is done before the installer is able to observe the resulting pattern of the tiles and the amount of cutting that had to be done to install the ceiling tiles. By use of the present invention, such an arrangement may be predetermined and the location of the main "T"'s and cross-hangers may be marked on a layout of the ceiling without trial and error, without mental gymnastics and without detailed calculations. Furthermore, various arrangements may be tried by merely moving a transparent sheet having a grid thereon representing the tiles with ease and simplicity. Furthermore, in accordance with the present invention, all of this may be accomplished very inexpensively.

It has been known in the past to use scaled gridded layouts in which models representing pieces of equipment, appliances, furniture and landscape items, such as trees and shrubbery, and the like were placed on a grid network to provide an indication of a possible layout of such items on a floor plan or landscape. For example, these types of teachings are shown in the following United States Pat. Nos.: 2,610,413—Dasey; 2,878,586—Ohlsson; 2,127,047—Pinney; 3,012,336—Brown; and 2,526,569—Lewis et al. None of the prior art references disclose a grid system for optimally arranging and laying out floor, wall or ceiling covering units such as tiles or the like wherein such covering units may be optimally arranged over a representation of the surface to be covered and in which the exact number of tile units may be counted and the proper cutting of such covering units may be determined before application to the surface to be covered.

SUMMARY OF THE INVENTION

In accordance with the present invention, an apparatus is provided for use in optimally arranging covering units such as tiles or the like on a surface to be covered, such as a floor, wall or ceiling. The apparatus further enables the exact counting and/or precutting of such covering units before they are applied to the surface to be covered. In accordance with the invention, a first grid is arranged on a substantially opaque sheet on which the dimensions of surface to be covered are scribed or otherwise laid out to a predetermined scale. A second grid or arrangement is provided on a substantially transparent sheet. The second grid corresponds to the covering units to be placed on the surface. The grid on the transparent sheet is scaled to correspond to the scaling of the first grid. By selectively positioning the second grid over the first grid, an optimal arrangement of the covering units, such as tiles, may be selected. Furthermore, the number of covering units, such as tiles, which have to be cut may be determined, and the exact degree of cutting may also be determined. Furthermore, the exact number of covering units needed in covering the surface, including the number which have to be cut, can be determined with precision.

The transparent sheet may be further provided with openings or holes at the intersection of the lines of the second grid to enable the marking of such points of intersection on the substantially opaque sheet. This enables the location on the opaque sheet of the points of necessary mounting of support structure for the covering units or tiles, such as "T" arrangements for suspended ceilings.

The present invention enables the optimal arrangement of floor, wall and ceiling tiles or other similar covering units to be optimally determined with accuracy and precision with a very minimal amount of expense. The structure of the present invention is inexpensive to produce. Nevertheless, it provides a great benefit in providing a visualization of a tile or other covering unit arrangement in the planning stage prior to installation.

A further advantage of the present invention is that it enables a quick and easy method of determining the exact number of tiles to be needed. This is an advantage as in many cases, a determination, based solely on a calculation of the area to be covered and the area provided by a certain number of tiles is inaccurate as the necessary cutting of a tile or covering unit precludes the use of the portion of the tile cut off. In other words, where tiles had to be cut to fit the particular area to be covered, the number of tiles usually exceeds the number determined by a calculation based solely upon area, but the excess amount needed is unknown without the use of the present invention.

The present invention further provides an advantage in that the covering unit to be cut may be determined in advance by means of the present invention and the exact nature of the cutting may also be predetermined. The cutting may then be done in advance enabling the rapid installation of the covering units at the job site. This is particularly so where the covering units may be difficult to cut on the job site and may be advantageously cut by use of a machine at another location.

The further advantage in accordance with the present invention is that the location of suspended ceiling structure or other support structure may be accurately determined in advance. A visual display may be provided with respect to the aesthetic arrangement of covering units prior to initiation of the installation.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

DETAILED DESCRIPTION OF THE PREFERRED EMBODIMENT

Figure 1:
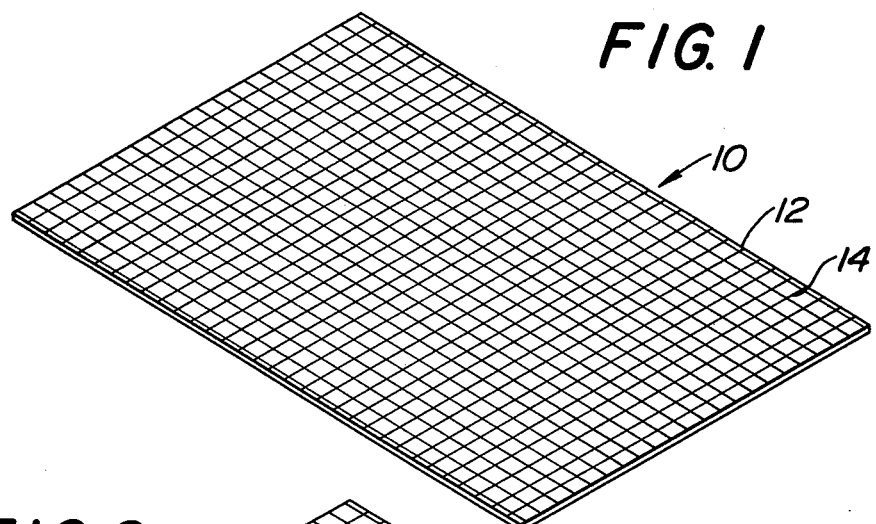
FIG. 1 is a view in perspective of a substantially opaque sheet having a grid network thereon.

Referring now to the drawings in detail wherein like numerals indicate like elements, there is shown in FIG. 1 a layout sheet 10 comprised of a substantially opaque sheet 12 having formed thereon a first grid 14. Substantially opaque sheet 12 may be comprised of any suitable sheet material on which the first grid 14 may be formed. Sheet 12 may preferrably be a sheet of paper with a grid formed thereon as the sheet 12 would then be very inexpensive and disposable. However, it is contemplated that within the meaning of the invention, sheet 12 may be comprised of any suitable opaque material such as sheets of synthetic plastic material, metal, wooden board, fiber board or any other suitable material on which a grid may be formed either by means of printing, scribing, etching or any other suitable process of forming a grid thereon.

Figure 2:
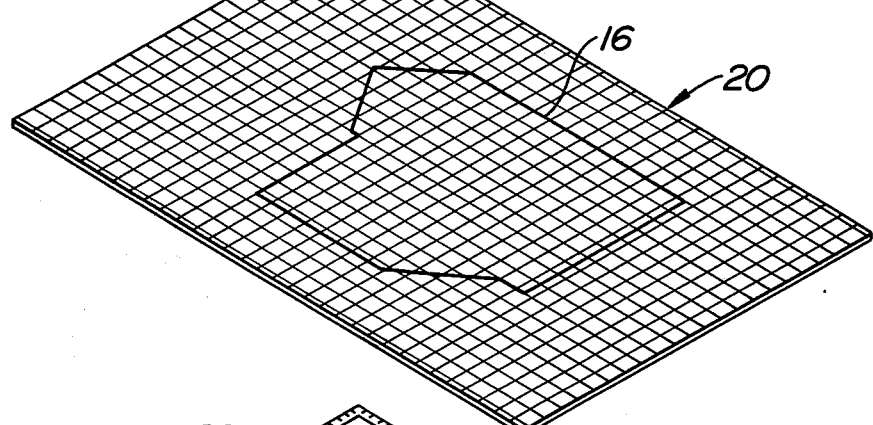
FIG. 2 is a view in perspective of the substantially opaque sheet with the scaled grid network thereon, as shown in FIG. 1, with a further illustration of a surface to be covered, such as a ceiling, scribed thereon to scale.

Referring now to FIG. 2, there is shown a layout sheet, such as layout sheet 10, with a layout or scribing 16 of a surface to be covered. The sheet 10 is provided or sold as shown in FIG. 1 and the layout or scribing 16 as shown in FIG. 2 is made by the user of the apparatus in laying out covering units to be applied to a surface to be covered. For convenience, the layout sheet shown in FIG. 10 with the layout of a typical surface to be covered thereon will be given the numeral 20. For purposes of illustration, and not by way of limitation, the layout 16 of the surface to be covered as shown in FIG. 2 may be a somewhat irregularly shaped ceiling with which it is desired to mount a suspended ceiling thereto. The layout 16 may be made on sheet 20 by any suitable means. In the case where the layout sheet 10 is comprised of a paper with printing thereon, it may be preferrable to form the layout on the sheet by means of a pencil or the like. However, if sheet 10 is comprised of a synthetic plastic material or a substantially non-porous material, such as a metal, it may be desirable to use a wax-type marking pencil which may be wiped off so that the sheet or board 10 may be reused.

Figure 3:
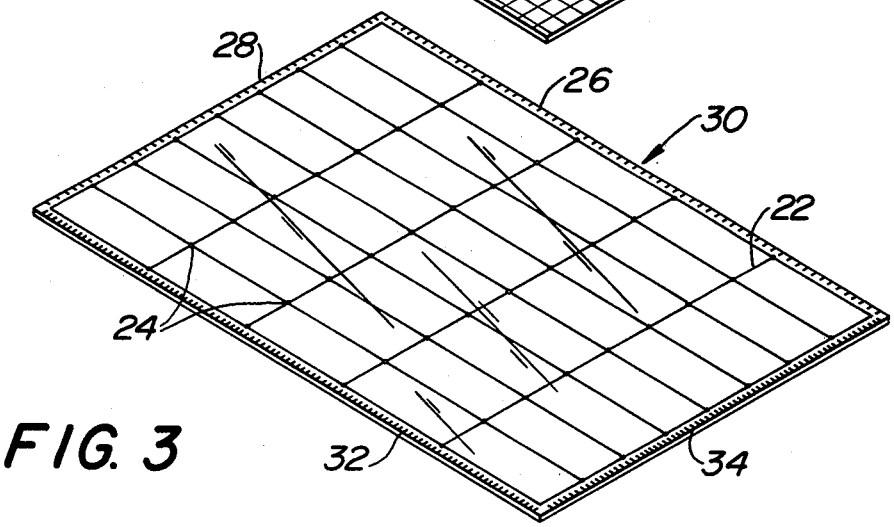
FIG. 3 is a view in perspective of a transparent sheet with a grid network thereon corresponding to one arrangement of a particular type of covering unit intended to be applied to a surface.

Referring to FIG. 3, there is shown an overlay sheet 30 having formed thereon a second grid 22 corresponding to the dimensions and selected arrangement of covering units to be applied to the surface to be covered. The covering units may be floor, wall or ceiling tiles or the like. The overlay sheet 30 is comprised of a sheet which is preferrably transparent or at least substantially transparent so that when it is placed over layout sheet 20, the layout of the surface 16 to be covered is visible therethrough, as will be described more fully hereinafter. Overlay sheet 30 is preferrably provided with holes or perforations 24 at the intersection of the grid lines 22 to enable marking of the location of such intersections onto layout sheet 20 as will be discussed more fully hereinafter, and as is most beneficial with respect to the layout of the location of support structures for the installation of suspended ceilings. Overlay sheet 30 is preferrably provided with measurement markings 26 and 28 along two adjacent edges in United States standard measure corresponding to inches, feet, etc. Overlay sheet 30 is also preferrably provided with metric measurements on adjacent edges 32 and 34, which are opposite those formed at 26 and 28.

The second grid as shown on transparent overlay sheet 30 in FIG. 3 is scaled to correspond to the scaling of the first grid on layout sheets 10 and 20. For example, the length of the edge of each block of the first grid on layout sheets 10 and 20 may correspond to six inches. The second grid formed on overlay sheet 30 would then correspond to the dimensions of the tile and also correspond to the scaling of the first grid on layout sheets 10 and 20. For example, the scaling of the first grid may be that a length of a side of each block of the grid corresponds to six inches of measurement of the surface to be covered. The scaling of the same grid 22 on transparent overlay sheet 30 would then correspond to this scale. In other words, if the grid 22 on overlay sheet 30 corresponds to ceiling tiles having a dimension of two feet by four feet, then the dimension of two feet or the narrower dimension on overlay sheet 30 would correspond to four block lengths of the first grid 14, each of which, in the example just given, represents six inches. Similarly, the longer dimension, or the four foot dimension of the two feet by four feet ceiling tiles as represented on overlay transparent sheet 30 would correspond to eight block lengths of the first grid 14. In fact, this correspondence may be seen by reference to FIG. 4 wherein transparent overlay sheet 30, which has been partially broken away, is shown placed over layout sheet 20 with the layout 16 of a surface to be covered.

Figure 4:
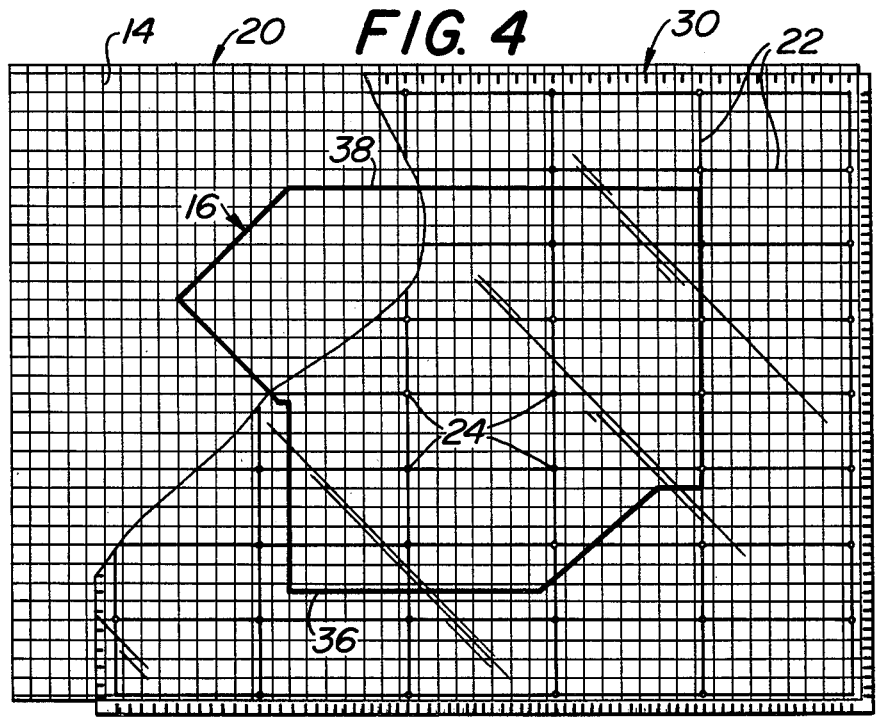
FIG. 4 is a plan view of one possible position of the transparent sheet of FIG. 3, partially broken away, layed over the grid of FIG. 2 with the surface to be covered scribed thereon.

As may be seen by reference to FIG. 4, the optimal positioning of the covering units, such as ceiling tiles, may be determined and visualized by moving or selectively positioning transparent overlay sheet 30 over layout 16 of the surface to be covered, such as a ceiling. It may be seen, for example, that by moving overlay sheet 30 downward by a distance corresponding to six inches, it would be unnecessary to cut the first or upper row of ceiling tiles to be installed, but, that this would result in an unsymmetrical appearance of the ceiling in that there would be no cutting along the edge of the ceiling corresponding to the upper line of layout 16, but that there would be cutting of the tiles covering the opposite end of the ceiling, which is represented by the lower line 36 of layout 16. The installer therefore may make a judgment, with all of the facts visually before him in a very presentable manner either to reduce the amount of cutting or to favor a symmetrical appearance of the ceiling which may in the judgment of the people who will live in the room be more aesthetically pleasing. In any event, this provides either the home owner who is installing the ceiling to visualize his end results before starting the job or to provide means by which a contractor may visually display the various options available to a homeowner having it installed by a professional installer. A simple and inexpensive means of providing such visualization of the various options available was not available in the past. In the past, it may have been possible for an architect to draw out such a plan, but this would require the drawing out of numerous plans for all of the possible options and did not provide the simple expedience of merely moving or selectively positioning overlay sheet 30 in various positions over layout sheet 20.

Further, once a desired layout is achieved, particularly in the case of installing suspended ceilings, the location of the supporting main "T"'s and cross branches of the support structure may be marked directly onto sheet 20 by means of utilizing a pencil or other marking device through the holes 24 in overlay sheet 30. The holes 24 may also be utilized in laying out other types of covering units, such as floor and wall tiles and ceiling tiles not requiring such a support structure where it is desired to place the location of a seam or a joint line at a particular location and still achieve a desired aesthetic appearance. In other cases, it may be desirable to know the location of a joint line of covering units such as floor tiles, prior to starting the installation, particularly in the situation where it may be desired to start laying the tiles from the center of the room outwards as contrasted to starting at one wall. In this manner, the appropriate starting line of location can be easily ascertained and marked off on the floor.

Figure 5:
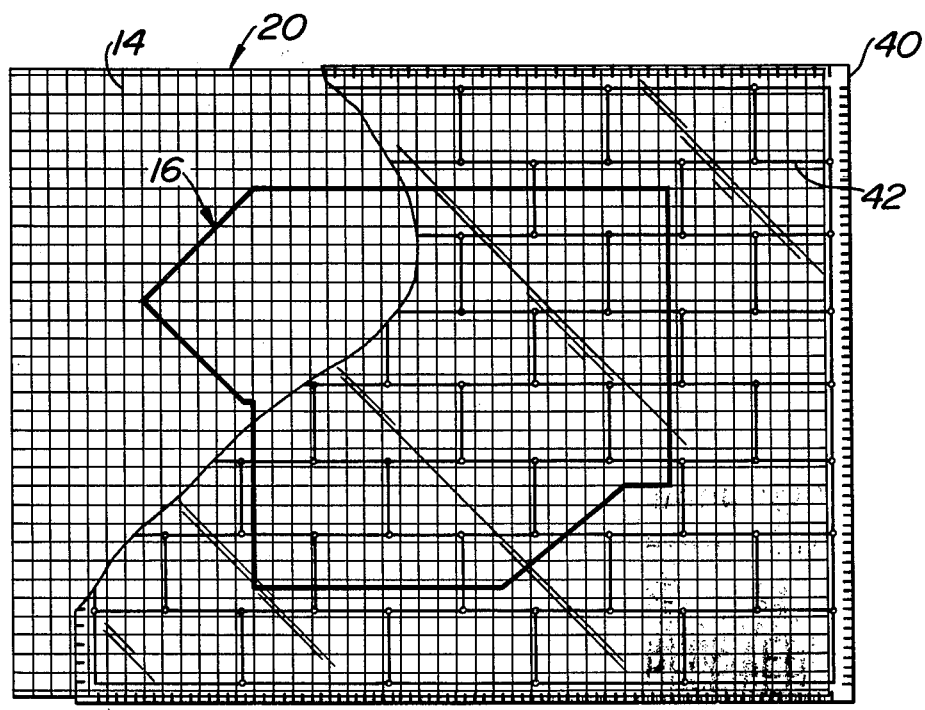
FIG. 5 is a plan view of a transparent sheet illustrating another possible arrangement of covering units laid over a grid network as shown in FIG. 2 with a surface to be covered scribed thereon.

Referring to FIG. 5, there is shown an arrangement similar to that of FIG. 4 except that a substantially transparent overlay sheet 40 is utilized which has a second grid 42 thereon which corresponds to an arrangement of ceiling tiles two feet by four feet, but arranged in a staggered arrangement. In other words, adjacent rows of covering units are staggered so that their end joints do not meet, but the joints in the adjacent row occur at the middle of the ceiling tile. Again, the same considerations and advantages may be achieved for this arrangement of covering units as previously described.

Figure 6:
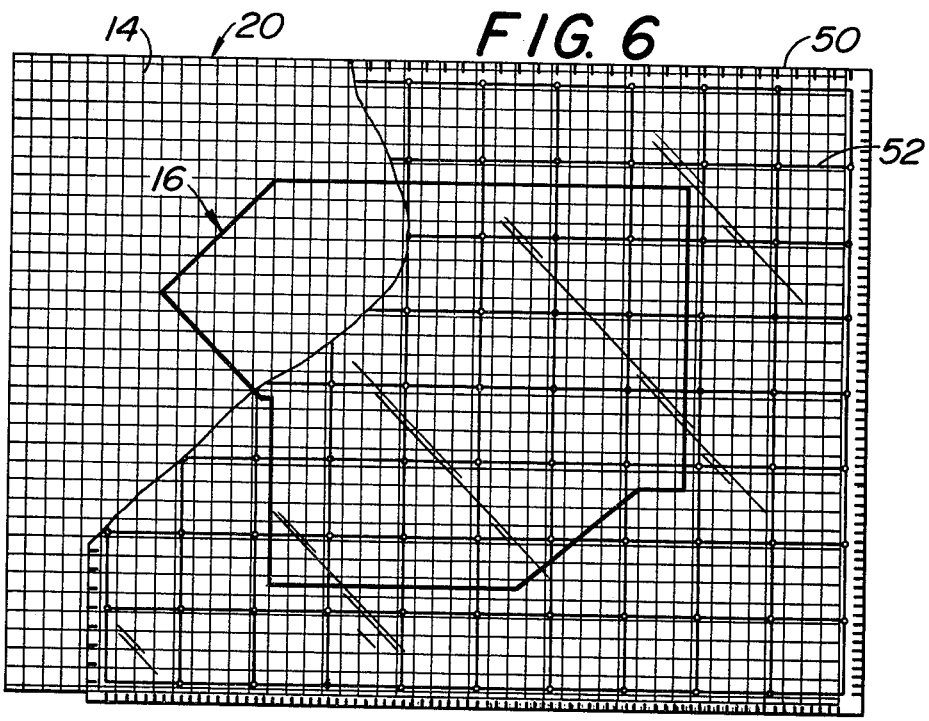
FIG. 6 is a plan view in accordance with the present invention of another transparent sheet representing a different type of covering unit laid over the grid network as shown in FIG. 2.

Referring to FIG. 6, there is shown a substantially transparent overlay sheet 50 having a second grid 52 formed thereon which may correspond to covering units or tiles having dimensions of two feet by two feet. Of course, by appropriate scaling, the overlay sheet 50 could correspond to a different dimension of covering unit, such as one foot by one foot, that is with the first grid 14 corresponding to each block representing three inches instead of six inches. Alternatively, of course, the scaling of the first grid may remain as originally specified with each block length corresponding to six inches with an overlay sheet having a second grid formed thereon which corresponds to such dimensions. In any event, it should be understood that the dimensions given throughout are merely concrete specific examples for purposes of illustration, and are not intended in any way to be limiting. It is clearly understood, that the scaling and dimensions may be chosen to meet the specific application.

Figure 7:
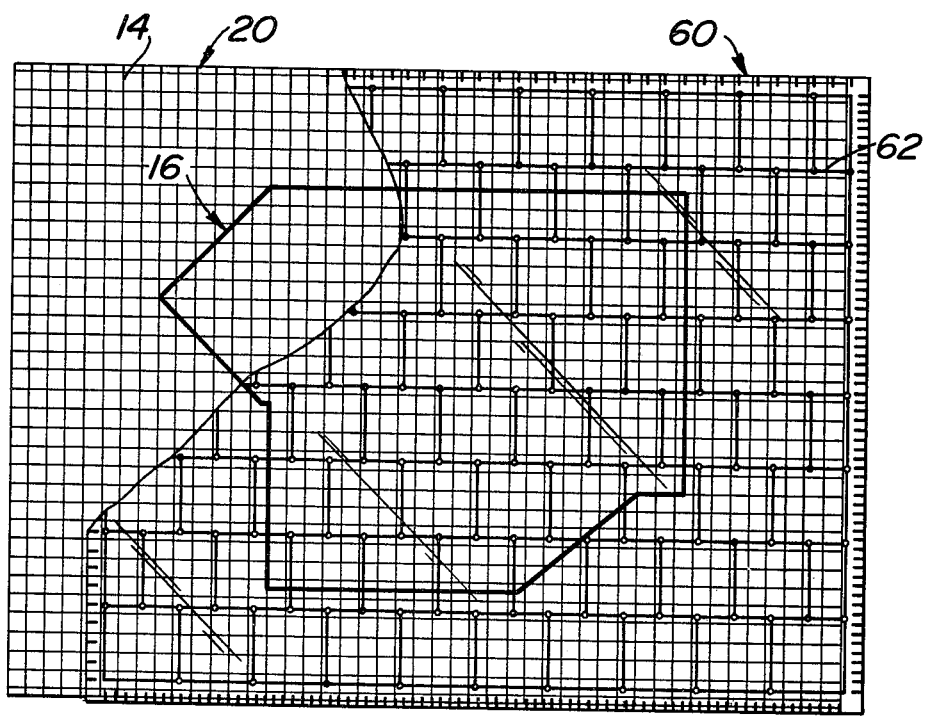
FIG. 7 is a plan view in accordance with the present invention of another transparent sheet corresponding to a different arrangement of the covering units shown in FIG. 6 laid over a surface to be covered scribed onto a grid network as shown in FIG. 2.

Referring now to FIG. 7, there is shown a substantially transparent overlay sheet 60 having a second grid thereon 62 corresponding to covering units having a dimension of two feet by two feet with a staggered arrangement of such covering units. In other words, overlay sheet 60 is similar to overlay sheet 50 except that the arrangement of the covering units, such as tiles, is varied to a staggered arrangement.

It is understood that the concept of the present invention has numerous applications and methods of usage. The unit may be sold as a kit available in general as a kit or aide in laying out and installing tile and various types of covering units. It is understood throughout this application that the word tile is not limited to a refractory type material, but is intended in a broader usage as any type of covering unit such as those which are commercially available for covering surfaces, including ceiling tiles, which are not usually made of a refractory type material. It is also anticipated that the present invention might be extremely beneficial as a kit which would be supplied by tile manufacturers, perhaps one included with each box of tiles for ready use by installers. In other words, in that particular application, a box of two by four tiles would include overlay transparency 30 and 40 along with one or several layout sheets 10. This would enable the installer to achieve the advantages of the present invention for that particular tile arrangement. It would obviously be unnecessary to provide overlay transparencies showing any other size tile arrangement with a box or supply of a specified tile size, such as ceiling tiles having the dimensions of two feet by four feet.

The present invention may be embodied in other specific forms without departing from the spirit or essential attributes thereof and, accordingly, reference should be made to the appended claims, rather than to the foregoing specification as indicating the scope of the invention.

I claim:

1. Apparatus for use in optimally arranging covering units, such as tiles or the like, or for precutting such covering units, comprising:

a first grid arranged on a substantially opaque sheet on which the dimensions of a surface to be covered, such as a floor, wall or ceiling, may be scribed or laid out to a predetermined scale; and a second grid or arrangement arranged on a substantially transparent sheet, said second grid being scaled to correspond to the scaling of said first grid and said second grid or arrangement corresponding to the dimensions and selected arrangement of said covering units to be applied to said surface whereby said second grid corresponding to said covering units may be selectably and optimally positioned over said first grid having thereon the layout of the surface to be covered and the necessary cutting of said covering units may be observed.

2. An apparatus in accordance with claim 1 wherein said transparent sheet is provided with openings at the intersection of the lines of said second grid thereon to enable the marking of the location of such intersections on said substantially opaque sheet.

3. An apparatus in accordance with claim 1 wherein said transparent sheet is provided with markings representing standard United States measure along one edge and markings representing metric measure along an opposite edge.

* * * * *